United States Patent
Liao et al.

(10) Patent No.: US 11,993,694 B2
(45) Date of Patent: May 28, 2024

(54) CONDUCTIVE POLYESTER COMPOSITION

(71) Applicant: NAN YA PLASTICS CORPORATION, Taipei (TW)

(72) Inventors: Te-Chao Liao, Taipei (TW); Chun-Che Tsao, Taipei (TW); Yueh-Shin Liu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/844,144

(22) Filed: Jun. 20, 2022

(65) Prior Publication Data

US 2023/0088098 A1    Mar. 23, 2023

(30) Foreign Application Priority Data

Sep. 13, 2021    (TW) .................................. 110133989

(51) Int. Cl.
  *H01B 1/24* (2006.01)
  *C01B 32/00* (2017.01)
  (Continued)

(52) U.S. Cl.
  CPC .............. *C08K 3/041* (2017.05); *C08L 67/00* (2013.01); *H01B 1/124* (2013.01); *H01B 1/24* (2013.01);
  (Continued)

(58) Field of Classification Search
  CPC .......... H01B 1/00; H01B 1/24; C01B 32/158; C08L 67/00; C08K 3/041
  See application file for complete search history.

(56) References Cited

U.S. PATENT DOCUMENTS

2004/0202603 A1* 10/2004 Fischer .............. B01J 20/28019
                                                        423/447.2
2010/0143714 A1*  6/2010 Chang .................... D04H 3/007
                                                           977/932
(Continued)

FOREIGN PATENT DOCUMENTS

CN        101778894 A       7/2010
CN        102712764 A      10/2012
(Continued)

OTHER PUBLICATIONS

Ding et al "Effects of Diameter and Aspect Ratio of Carbon Nanotubes on Crystalline and Electrical Properties of Poly(ethylene terephthalate) Nanocomposites", Polymer Engineering and Science—2016, pp. 408-417.*

(Continued)

*Primary Examiner* — Mark Kopec
(74) *Attorney, Agent, or Firm* — Li & Cai Intellectual Property (USA) Office (57) ABSTRACT

A conductive polyester composition is provided, which includes a polyester base material and a conductive reinforcing material. The conductive reinforcing material includes a plurality of carbon nanotubes, and the plurality of carbon nanotubes are dispersed in the polyester base material. In each of the carbon nanotubes, a length of the carbon nanotube is defined as L, a diameter of the carbon nanotube is defined as D and is between 1 nanometer and 30 nanometers, and an L/D value of the carbon nanotube is between 300 and 2,000. The plurality of carbon nanotubes are in contact with each other to form a plurality of contact points, so that the conductive polyester composition has a surface impedance of not greater than $10^7$ Ω/sq.

10 Claims, 3 Drawing Sheets

(51) Int. Cl.
*C08K 3/04* (2006.01)
*C08L 67/00* (2006.01)
*H01B 1/12* (2006.01)

(52) U.S. Cl.
CPC .. *C08K 2201/001* (2013.01); *C08K 2201/011* (2013.01); *C08L 2201/08* (2013.01); *C08L 2310/00* (2013.01)

(56) References Cited

U.S. PATENT DOCUMENTS

| | | | |
|---|---|---|---|
| 2011/0204298 | A1 | 8/2011 | Chang et al. |
| 2012/0292578 | A1* | 11/2012 | Bacher ............... B29B 7/845 252/511 |
| 2013/0156992 | A1* | 6/2013 | Okumura ............ D06M 13/477 428/74 |
| 2014/0356579 | A1 | 12/2014 | Shin et al. |
| 2016/0083899 | A1* | 3/2016 | Onizuka ................ C08J 5/005 423/447.2 |
| 2023/0088091 | A1* | 3/2023 | Liao ..................... C08J 5/042 428/480 |

FOREIGN PATENT DOCUMENTS

| | | |
|---|---|---|
| CN | 102850735 A | 1/2013 |
| CN | 102942810 A | 2/2013 |
| CN | 102952383 A | 3/2013 |
| CN | 103013057 A | 4/2013 |
| CN | 104212143 A | 12/2014 |
| CN | 104845184 A | 8/2015 |
| CN | 106046709 A | 10/2016 |
| CN | 108084686 A | 5/2018 |
| JP | 201297133 A | 5/2012 |
| KR | 1020090059296 A | 6/2009 |
| KR | 1020120078468 A | 7/2012 |
| TW | 201022325 A1 | 6/2010 |

OTHER PUBLICATIONS

Urena-Benavides et al "Dispersion and Rheology of Multiwalled Carbon Nanotubes in Unsaturated Polyester Resin", dx.doi.org/10.1021/ma3017844 I Macromolecules 2013, 46, 1642-1650.*

Shokrieh et al "Mechanical properties of multi-walled carbon nanotube/polyester nanocomposites" Journal Of Nanostructure in Chemistry 2013, 3:20 (5 pages).*

Hu et al "Low percolation thresholds of electrical conductivity and rheology in poly(ethylene terephthalate) through the networks of multi-walled carbon nanotubes", Polymer 47 (2006) 480-488.*

Braga et al "Influence of compatibilizer and carbon nanotubes on mechanical, electrical, and barrier properties of PTT/ABS blends", Advanced Industrial and Engineering Polymer Research 2 (2019) 121-125.*

Lee et al "Rheological and electrical properties of polypropylene composites containing functionalized multi-walled carbon nanotubes and compatibilizers", Carbon 45 (2007) 2810-2822.*

* cited by examiner

CONDUCTIVE POLYESTER COMPOSITION

CROSS-REFERENCE TO RELATED PATENT APPLICATION

This application claims the benefit of priority to Taiwan Patent Application No. 110133989, filed on Sep. 13, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a polyester composition, and more particularly to a conductive polyester composition having a high conductive property.

BACKGROUND OF THE DISCLOSURE

In the related art, the conductive property of a polyester material is often improved by adding a spherical conductive material (with an L/D value of less than 10), such as conductive graphite or conductive carbon black. When the graphite or the carbon black are used as a conductive additive, an extremely high proportion of addition (e.g., greater than 20 wt %) is required, so that the polyester material can have a conductive effect.

However, due to poor extensibility, such conductive polyester materials are susceptible to a phenomenon of powder falling (e.g., graphite or carbon black). Further, after a high-rate extension, these conductive polyester materials do not have the conductive property.

SUMMARY OF THE DISCLOSURE

In response to the above-referenced technical inadequacies, the present disclosure provides a conductive polyester composition.

In one aspect, the present disclosure provides a conductive polyester composition, which includes: a polyester base material and a conductive reinforcing material. The conductive reinforcing material includes a plurality of carbon nanotubes, and the plurality of carbon nanotubes are dispersed in the polyester base material. In each of the carbon nanotubes, a length of the carbon nanotube is defined as L, a diameter of the carbon nanotube is defined as D and is between 1 nanometer and 30 nanometers, and an L/D value of the carbon nanotube is between 300 and 2,000. The plurality of carbon nanotubes are in contact with each other to form a plurality of contact points, so that the conductive polyester composition has a surface impedance of not greater than $10^7$ Ω/sq.

In certain embodiments, in each of the carbon nanotubes, the length is between 10 micrometers and 20 micrometers, the diameter is between 5 nanometers and 20 nanometers, and the L/D value is between 1,000 and 2,000.

In certain embodiments, based on a total weight of the conductive polyester composition, a content of the polyester base material is between 70 wt % and 95 wt %, and a content of the conductive reinforcing material is between 1.5 wt % and 10 wt %.

In certain embodiments, the plurality of carbon nanotubes of the conductive reinforcing material are multi-walled carbon nanotubes (MWCNT) having a multi-layer carbon atom structure.

In certain embodiments, the conductive polyester composition further includes: a compatibilizer configured to assist in dispersing the plurality of carbon nanotubes in the polyester base material. Based on the total weight of the conductive polyester composition, a content of the compatibilizer is between 1.5 wt % and 10 wt %.

In certain embodiments, the plurality of carbon nanotubes of the conductive reinforcing material are at least one material selected from a group consisting of hydroxylated carbon nanotubes and carboxylic carbon nanotubes. The compatibilizer is a polyolefin compatibilizer formed by grafting, modification or copolymerization of glycidyl methacrylate (GMA), or a siloxane compound.

In certain embodiments, the glycidyl methacrylate in the molecular structure of the compatibilizer can carry out a ring cleavage reaction in a mixing process, and an epoxy group in the glycidyl methacrylate can carry out a chemical reaction with a reactive functional group on the surface of the carbon nanotube and/or an ester group in the molecular structure of the polyester base material after the ring cleavage reaction, so that the carbon nanotubes are dispersed in the polyester base material. The reactive functional group on the surface of the carbon nanotube is at least one of a —OH functional group and a —COOH functional group.

In certain embodiments, the plurality of carbon nanotubes of the conductive reinforcing material are at least one material selected from a group consisting of hydroxylated multi-walled carbon nanotubes and carboxylic multi-walled carbon nanotubes.

In certain embodiments, the compatibilizer is at least one material selected from a group consisting of an ethylene-methyl acrylate-glycidyl methacrylate copolymer (E-MA-GMA), polyolefin elastomer-grafted glycidyl methacrylate (POE-g-GMA), polyethylene-grafted glycidyl methacrylate (PE-g-GMA), and a siloxane compound.

In certain embodiments, the conductive polyester composition further includes: an antioxidant and black master batches. Based on the total weight of the conductive polyester composition, a content of the antioxidant is between 0.1 wt % and 1 wt %, and a content of the black master batches is between 1 wt % and 5 wt %.

In certain embodiments, the conductive polyester composition is configured to be subjected to mixing modification of a twin-screw process, and the conductive polyester composition has a surface impedance of not greater than $10^7$ Ω/sq after the mixing modification of the twin-screw process.

In certain embodiments, after the conductive polyester composition is subjected to the mixing modification of the twin-screw process, a conductive polyester sheet material is formed. The conductive polyester sheet material has a surface impedance of $10^3$ Ω/sq to $10^4$ Ω/sq before an extension, and has a surface impedance of $10^4$ Ω/sq to $10^7$ Ω/sq after a 200% to 400% extension along an extension direction.

Therefore, in the conductive polyester composition provided by the present disclosure, by virtue of "the conductive reinforcing material including a plurality of carbon nanotubes, and the plurality of carbon nanotubes being dispersed in the polyester base material," "in each of the carbon nanotubes, a length of the carbon nanotube being defined as L, a diameter of the carbon nanotube being defined as D and being between 1 nanometer and 30 nanometers, and an L/D value of the carbon nanotube being between 300 and 2,000," and "the plurality of carbon nanotubes being in contact with each other to form a plurality of contact points, so that the conductive polyester composition has a surface impedance of not greater than $10^7$ Ω/sq," the conductive polyester composition can still have a high conductive property with a small addition of the conductive reinforcing material and after a high-rate extension.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Conductive Polyester Composition

Figure 1:
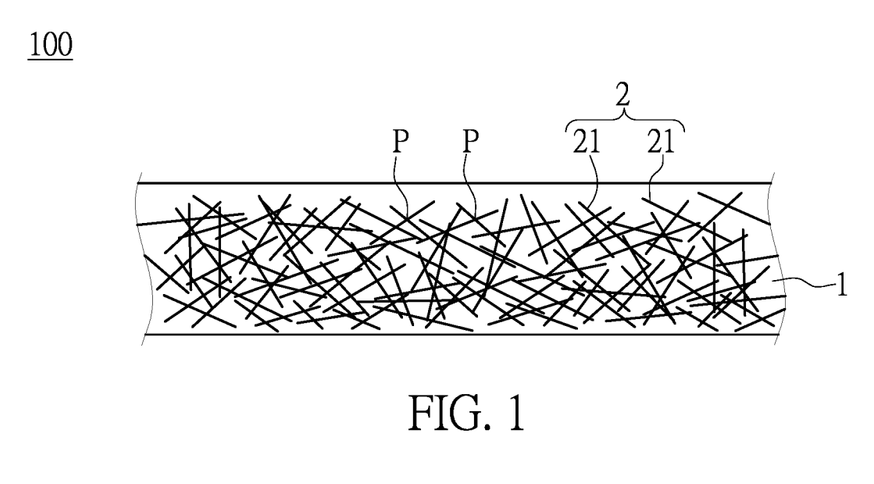
FIG. 1 is a schematic diagram of a conductive polyester composition according to an embodiment of the present disclosure.

As shown in FIG. 1, an embodiment of the present disclosure provides a conductive polyester composition 100, and the conductive polyester composition 100 includes a polyester base material 1 and a conductive reinforcing material 2. The conductive polyester composition 100 of this embodiment can obtain a high conductive property through selection of a material type of the conductive reinforcing material 2 and adjustment of its content range. Further, after a high-rate extension, the conductive polyester composition 100 of this embodiment can still have a high conductive property. Accordingly, the conductive polyester composition 100 of this embodiment is particularly suitable for manufacturing electronic carrier trays or electronic carrier tapes having a need for extension formation.

In this embodiment, the polyester base material 1 is a base material of the conductive polyester composition 100. The polyester base material 1 is a macromolecular polymer obtained by a condensation polymerization reaction between a dibasic acid and a dibasic alcohol or a derivative thereof. That is to say, the polyester base material 1 is a polyester material. Preferably, the polyester material is polyethylene terephthalate (PET) or polyethylene naphthalate (PEN). More preferably, the polyester material is polyethylene terephthalate (PET), but the present disclosure is not limited thereto.

In terms of content range, based on a total weight of the conductive polyester composition 100, a content of the polyester base material 1 is preferably between 70 wt % and 95 wt %, and more preferably between 75 wt % and 95 wt %. It should be noted that the term "base material" used herein refers to a material having a content of at least more than half of the composition, so that the base material can present as a continuous-phase medium and can show material properties thereof (e.g., processability for extension formation).

The aforementioned dibasic acid for forming the polyester material is at least one of terephthalic acid, isophthalic acid, 1,5-naphthalic acid, 2,6-naphthalic acid, 1,4-naphthalic acid, diphenic acid, diphenylethane dicarboxylic acid, diphenylsulfone dicarboxylic acid, anthracene-2,6-dicarboxylic acid, 1,3-cyclopentane dicarboxylic acid, 1,3-cyclohexane dicarboxylic acid, 1,4-cyclohexane dicarboxylic acid, malonic acid, dimethylmalonic acid, succinic acid, 3,3-diethyl succinate, glutaric acid, 2,2-dimethylglutaric acid, adipic acid, 2-methyladipic acid, trimethyladipic acid, pimelic acid, azelaic acid, sebacic acid, suberic acid, and dodecanedioic acid.

Further, the aforementioned dibasic alcohol for forming the polyester material is at least one of ethylene glycol, propylene glycol, hexamethylene glycol, neopentyl glycol, 1,2-cyclohexane dimethanol, 1,4-cyclohexane dimethanol, 1,10-decanediol, 1,3-propanediol, 1,4-butanediol, 1,5-pentanediol, 1,6-hexanediol, and 2,2-bis(4-hydroxyphenyl)propane or bis(4-hydroxybenzene) sulfone.

Still referring to FIG. 1, in order to obtain a high conductive property of the conductive polyester composition 100, the conductive reinforcing material 2 includes a plurality of carbon nanotubes 21, and the plurality of carbon nanotubes 21 are uniformly dispersed in the polyester base material 1.

Figure 2:
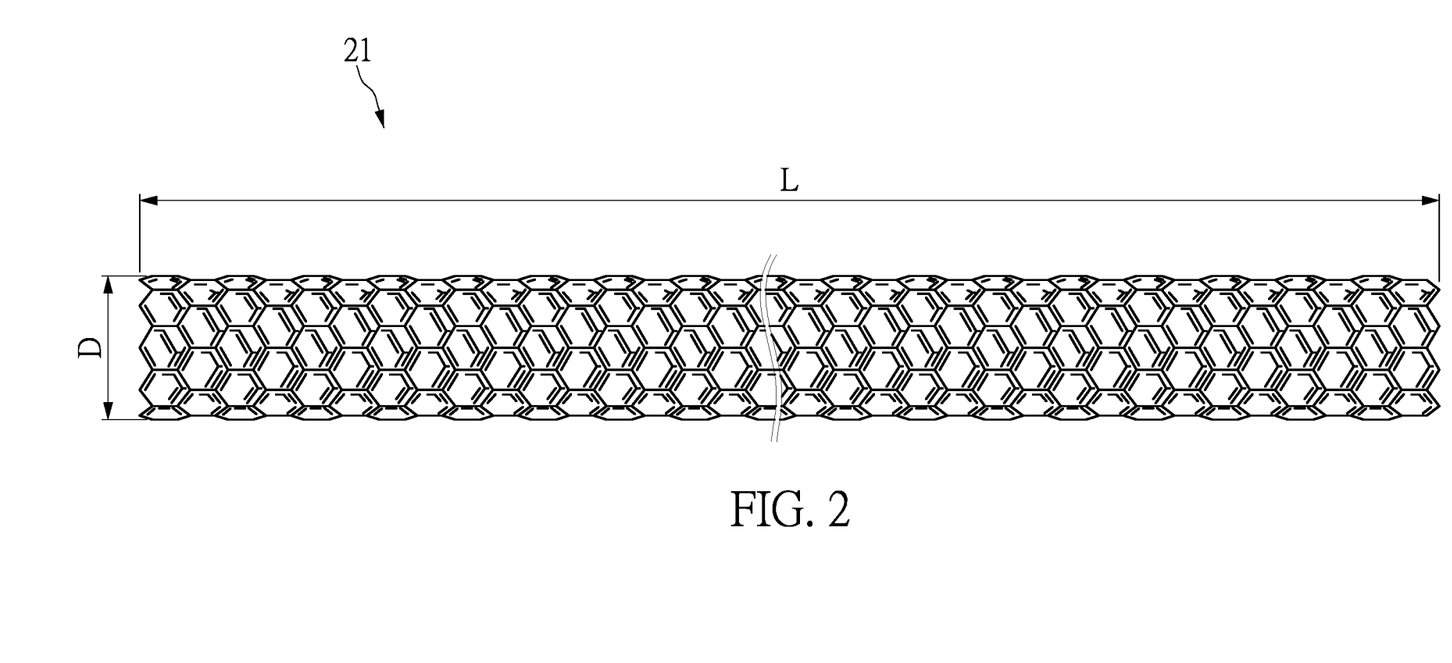
FIG. 2 is a schematic diagram of a carbon nanotube in the conductive polyester composition according to the embodiment of the present disclosure.

As shown in FIG. 2, in each of the carbon nanotubes 21, a length of the carbon nanotube 21 is defined as L and is between 5 micrometers and 30 micrometers, and a diameter of the carbon nanotube 21 is defined as D and is between 1 nanometer and 30 nanometers. Further, an L/D value (also known as length-diameter ratio) of the carbon nanotube 21 is between 300 and 2,000.

It is worth mentioning that in this embodiment, when the plurality of carbon nanotubes 21 are dispersed in the polyester base material 1, the plurality of carbon nanotubes 21 are continuously dispersed in the polyester base material 1 and are in contact with each other, so as to form a plurality of contact points P in continuous distribution (as shown in FIG. 1). Therefore, the plurality of carbon nanotubes 21 can be connected with each other, so that the conductive polyester composition 100 can have a high conductive property and a low surface impedance. Specifically, the conductive polyester composition 100 has a surface impedance of not greater than $10^7$ Ω/sq.

Figure 3:
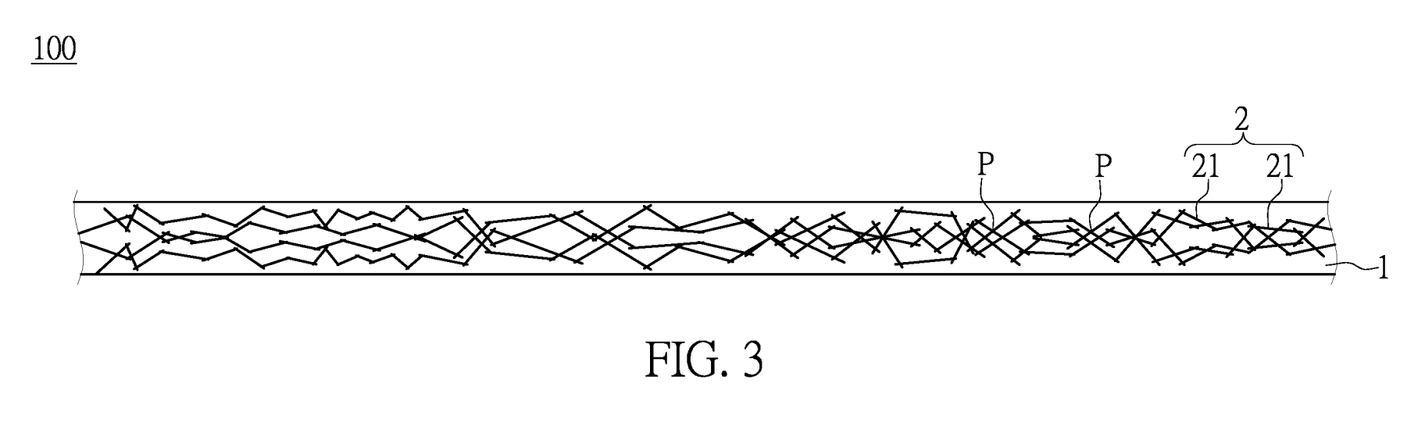
FIG. 3 is a schematic diagram of the conductive polyester composition in FIG. 1 after an extension.

In one embodiment of the present disclosure, in order to maintain a high conductive property and a low surface impedance of the conductive polyester composition 100 after an extension, an exemplary range is set for the dimensions and specifications of the carbon nanotubes 21. Specifically, in each of the carbon nanotubes 21, the length L of the carbon nanotube 21 is preferably between 10 micrometers and 20 micrometers, the diameter D of the carbon nanotube 21 is preferably between 3 nanometers and 20 nanometers, and the L/D value of the carbon nanotube 21 is preferably between 1,000 and 2,000. In this embodiment, since the length L of the carbon nanotube 21 is long enough and the L/D value is high enough, the conductive polyester composition 100 can still have the plurality of contact points P in continuous distribution (as shown in FIG. 3) after the high-rate extension (e.g., a 200% to 400% extension), thereby having a high conductive property.

In terms of content range, based on the total weight of the conductive polyester composition 100, a content of the conductive reinforcing material 2 is preferably between 1.5 wt % and 10 wt %, and more preferably between 2 wt % and 5 wt %. That is to say, the conductive polyester composition 100 can obtain a high conductive property and a low surface impedance by having only a small addition (not greater than 10 wt %) of the plurality of carbon nanotubes 21 of the conductive reinforcing material 2.

If the content of the conductive reinforcing material 2 is below a lower limit of the aforementioned content range (e.g., below 1.5 wt %), the plurality of carbon nanotubes 21 cannot form enough contact points in the conductive polyester composition 100, and thus the conductive polyester composition 100 cannot obtain a high conductive property or a low surface impedance. On the contrary, if the content of the conductive reinforcing material 2 is above an upper limit of the aforementioned content range (e.g., above 10 wt %), the plurality of carbon nanotubes 21 may have a problem of poor dispersity in the conductive polyester composition 100, and problems including poor processability and extension difficulty may be present in the conductive polyester composition 100.

In terms of material type, the plurality of carbon nanotubes 21 can be at least one material selected from a group consisting of single-walled carbon nanotubes (SWCNT), double-walled carbon nanotubes (DWCNT) and multi-walled carbon nanotubes (MWCNT).

As shown in FIG. 2, in one embodiment of the present disclosure, the plurality of carbon nanotubes 21 are preferably multi-walled carbon nanotubes (MWCNT) having a multi-layer carbon atom structure. The advantage of using the multi-walled carbon nanotubes resides in that a low structural symmetry of the multi-walled carbon nanotube facilitates surface modification, such that the compatibility and dispersity of the multi-walled carbon nanotube in a resin material can be improved. In addition, the structure of the multi-walled carbon nanotube is formed by rolling and stacking several to dozens of layers of concentric single-walled circular pipes, and is thus more suitable for extension. After the extension, problems such as breakage or structural damage are also less likely to occur. In practical application, since the conductive polyester composition 100 of this embodiment needs to perform on the high-rate extension, using the multi-walled carbon nanotubes allows a material to achieve a wide extensible range.

In one embodiment of the present disclosure, in order to improve the compatibility and dispersity of the conductive reinforcing material 2 in the polyester base material 1, the conductive polyester composition 100 further includes a compatibilizer (not shown in the figure). The compatibilizer is configured to assist in dispersing the plurality of carbon nanotubes 21 in the polyester base material 1.

In terms of content range, based on the total weight of the conductive polyester composition 100, a content of the compatibilizer is preferably between 1.5 wt % and 10 wt %, and more preferably between 2 wt % and 10 wt %.

In order to use the compatibilizer to effectively improve the dispersity of the carbon nanotubes 21 in the polyester base material 1, an exemplary weight ratio range is provided between the compatibilizer and the carbon nanotubes.

Specifically, the weight ratio range between the compatibilizer and the carbon nanotubes is between 2:1 and 1:1. For example, in the conductive polyester composition 100, the content of the compatibilizer can be 6 wt %, and a content of the carbon nanotubes can be 3 wt %. Or, for example, the content of the compatibilizer can be 3 wt %, and the content of the carbon nanotubes can be 3 wt %. From another perspective, the content of the compatibilizer is preferably at least not less than a content range of the carbon nanotubes, but the present disclosure is not limited thereto.

In one embodiment of the present disclosure, in order to improve the compatibility and dispersity of the conductive reinforcing material 2 in the polyester base material 1, the plurality of carbon nanotubes 21 of the conductive reinforcing material 2 are at least one material selected from a group consisting of hydroxylated carbon nanotubes and carboxylic carbon nanotubes. That is to say, the carbon nanotubes 21 are —OH modified or —COOH modified carbon nanotubes 21. Further, the compatibilizer is a polyolefin compatibilizer formed by grafting, modification or copolymerization of glycidyl methacrylate (GMA), or a siloxane compound.

According to the aforementioned configuration, the glycidyl methacrylate (GMA) in the molecular structure of the compatibilizer can carry out a ring cleavage reaction in a mixing modification process, and an epoxy group in the glycidyl methacrylate can carry out a chemical reaction (e.g., covalent bonding) with a reactive functional group on the surface of the carbon nanotube 21 and/or an ester group in the molecular structure of the polyester base material 1 after the ring cleavage reaction, so that the carbon nanotubes 21 are more compatible with the polyester base material 1 and are dispersed more uniformly in the polyester base material 1.

The reactive functional group on the surface of the carbon nanotube 21 is at least one of a —OH functional group and a —COOH functional group. Further, the epoxy group in the glycidyl methacrylate can, for example, form covalent bonding with the reactive functional group on the surface of the carbon nanotube 21 and/or the ester group in the molecular structure of the polyester base material 1.

More specifically, in one embodiment of the present disclosure, the plurality of carbon nanotubes 21 of the conductive reinforcing material 2 are at least one material selected from a group consisting of hydroxylated multi-walled carbon nanotubes and carboxylic multi-walled carbon nanotubes, but the present disclosure is not limited thereto.

More specifically, in one embodiment of the present disclosure, the compatibilizer is at least one material selected from a group consisting of an ethylene-methyl acrylate-glycidyl methacrylate copolymer (E-MA-GMA), polyolefin elastomer-grafted glycidyl methacrylate (POE-g-GMA), polyethylene-grafted glycidyl methacrylate (PE-g-GMA) and a siloxane compound. Preferably, the compatibilizer is formed by combination of the ethylene-methyl acrylate-glycidyl methacrylate copolymer (E-MA-GMA), and the siloxane compound, but the present disclosure is not limited thereto.

It is worth mentioning that in the aforementioned compatibilizer, a molecular structure of the glycidyl methacrylate (hereinafter referred to as GMA) contains double reactive functional groups of a carbon-carbon double bond and an epoxy group. The GMA itself is a colorless transparent liquid insoluble in water and easily soluble in organic solvents. The GMA is irritant to skin and mucosa, but is almost nontoxic. With double functional groups, the GMA can carry out a free radical type reaction as well as an ionic type reaction, and thus has a very high reactivity. Accordingly, the GMA can be widely applied in synthesis and improvement of polymer materials. For example, after grafting and modification of the GMA, polyolefin such as polyethylene (PE), polypropylene (PP), and polyethylene-octylene (POE) can significantly improve the bonding capacity and hydrophilicity of the polymer as well as its compatibility with a polymer resin.

In one embodiment of the present disclosure, in order to improve an antioxidant property of the conductive polyester composition 100, the conductive polyester composition 100 further includes an antioxidant. In terms of content range, based on the total weight of the conductive polyester composition 100, a content of the antioxidant is between 0.1 wt % and 1 wt %, but the present disclosure is not limited thereto.

In terms of material type, the antioxidant can be, for example, at least one material selected from a group consisting of a hindered phenol-based antioxidant, a phenol antioxidant, a mixed type antioxidant, a phosphite-based antioxidant and a composite antioxidant. Preferably, the antioxidant is a complex of the phosphite-based antioxidant and the hindered phenol-based antioxidant.

In one embodiment of the present disclosure, in order to improve an overall degree of blackness of the conductive polyester composition 100, the conductive polyester composition 100 further includes black master batches. In terms of content range, based on the total weight of the conductive polyester composition 100, a content of the black master batches is between 1 wt % and 5 wt %, but the present disclosure is not limited thereto. The black master batches are added to control a hue of a conductive polyester material.

According to selection of the material type of the aforementioned conductive polyester composition 100 and adjustment of its content range, the conductive polyester composition 100 of this embodiment can be subjected to mixing modification of a twin-screw process, so that the conductive reinforcing material 2 can be uniformly dispersed in the polyester base material 1 and the conductive polyester composition 100 can have a high conductive property and a low surface resistance. It is worth mentioning that, after the mixing modification of the twin-screw process, the conductive polyester composition 100 has a surface impedance of not greater than $10^7$ Ω/sq.

More specifically, after the conductive polyester composition 100 is subjected to the mixing modification of the twin-screw process, a conductive polyester sheet material is formed. The conductive polyester sheet material can be used for manufacturing the electronic carrier tapes or the electronic carrier trays.

The conductive polyester sheet material has a surface impedance of $10^3$ Ω/sq to $10^4$ Ω/sq before the extension, and has a surface impedance of $10^4$ Ω/sq to $10^7$ Ω/sq after the 200% to 400% extension along an extension direction (e.g., a transverse direction (TD) or a machine direction (MD)). It is worth mentioning that, after the conductive polyester sheet material is extended, while a distribution density of the plurality of carbon nanotubes 21 becomes lower, the plurality of carbon nanotubes 21 are still in contact with each other and form the plurality of contact points P (as shown in FIG. 3), thereby still capable of providing a certain conductive property.

One embodiment of the present disclosure further provides an electronic carrier tape that is prepared from the aforementioned conductive polyester composition 100 and subjected to extension formation.

One embodiment of the present disclosure further provides an electronic carrier tray that is prepared from the aforementioned conductive polyester composition 100 and subjected to extension formation.

Experimental Data and Test Results

Hereinafter, a more detailed description will be provided with reference to Example 1 and Comparative examples 1 and 2. However, the examples below are only provided to aid in understanding of the present disclosure, and are not to be construed as limiting the scope of the present disclosure.

In Example 1, a polyester composition is added with 3 wt % of carbon nanotubes and made into a conductive polyester sheet material. In Example 1, the specifications of the carbon nanotubes are as follows: multi-walled carbon nanotubes, an average diameter of 5 nanometers to 15 nanometers, an average length of 10 micrometers to 20 micrometers, an L/D value of 1,000 to 2,000, a surface area of 200 $m^2$/g to 300 $m^2$/g, a purity of not less than 90%, and an overall density of 0.950 to 0.150.

Test results of electrical performance of Example 1 show that the conductive polyester sheet material has a surface resistance of $10^3$ Ω/sq to $10^4$ Ω/sq without an extension, has a surface resistance of $10^4$ Ω/sq to $10^5$ Ω/sq with a 200% extension, and has a surface resistance of $10^6$ Ω/sq to $10^7$ Ω/sq with a 400% extension. The aforementioned test results indicate that a small addition of the carbon nanotubes can achieve a high conductive property and a low surface resistance of a conductive polyester composition. Further, even after a high-rate extension, the conductive polyester composition of Example 1 can still have a high conductive property.

In Comparative example 1, the polyester composition is added with 25 wt % of a conductive graphite spherical material and made into a conductive polyester sheet material. Test results of electrical performance of Comparative example 1 show that the conductive polyester sheet material has a surface resistance of about $10^5$ Ω/sq without the extension, has a surface resistance of about $10^{11}$ Ω/sq with the 200% extension, and has a surface resistance of about $10^{11}$ Ω/sq with the 400% extension. The aforementioned test results indicate that a large addition of the conductive graphite material is required to achieve a high conductive property of the conductive polyester composition. However, after the high-rate extension, the conductive polyester composition of Comparative example 1 does not have a high conductive property.

In Comparative example 2, the polyester composition is added with 20 wt % of a conductive carbon black spherical material and made into a conductive polyester sheet material. Test results of electrical performance of Comparative example 2 show that the conductive polyester sheet material has a surface resistance of about $10^5$ Ω/sq without the extension, has a surface resistance of about $10^{10}$ Ω/sq with the 200% extension, and has a surface resistance of about $10^{11}$ Ω/sq with the 400% extension. The aforementioned test results indicate that a large addition of the conductive carbon black material is required to achieve a high conductive property of the conductive polyester composition. However, after the high-rate extension, the conductive polyester composition of Comparative example 2 does not have a high conductive property.

A test method for the aforementioned surface resistance is to test the conductive polyester sheet material with a surface resistance tester.

TABLE 1

[Experimental data and test results]

| Formula/Test Results | Example 1 | Comparative Example 1 | Comparative Example 2 |
| --- | --- | --- | --- |
| Polyester composition | 3 wt % of carbon nanotubes | 25 wt % of conductive graphite | 20 wt % of conductive carbon black |
| Surface resistance (without extension) | $10^3$ Ω/sq to $10^4$ Ω/sq | $10^5$ Ω/sq | $10^5$ Ω/sq |
| Surface resistance (200% extension) | $10^4$ Ω/sq to $10^5$ Ω/sq | $10^{11}$ Ω/sq | $10^{10}$ Ω/sq |
| Surface resistance (400% extension) | $10^6$ Ω/sq to $10^7$ Ω/sq | $10^{11}$ Ω/sq | $10^{11}$ Ω/sq |

Beneficial Effects of the Embodiments

In conclusion, in the conductive polyester composition provided by the present disclosure, by virtue of "the conductive reinforcing material including a plurality of carbon nanotubes, and the plurality of carbon nanotubes being dispersed in the polyester base material," "in each of the carbon nanotubes, a length of the carbon nanotube being defined as L, a diameter of the carbon nanotube being defined as D and being between 1 nanometer and 30 nanometers, and an L/D value of the carbon nanotube being between 300 and 2,000," and "the plurality of carbon nanotubes being in contact with each other to form a plurality of contact points, so that the conductive polyester composition has a surface impedance of not greater than $10^7$ Ω/sq," the conductive polyester composition can still have a high conductive property with a small addition of the conductive reinforcing material and after a high-rate extension.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A conductive polyester composition, comprising:
   a polyester base material; and
   a conductive reinforcing material, wherein the conductive reinforcing material includes a plurality of carbon nanotubes, and the plurality of carbon nanotubes are dispersed in the polyester base material; wherein in each of the carbon nanotubes, a length of the carbon nanotube is defined as L, a diameter of the carbon nanotube is defined as D and is between 1 nanometer and 30 nanometers, and an L/D value of the carbon nanotube is between 1,000 and 2,000; wherein the plurality of carbon nanotubes are in contact with each other to form a plurality of contact points, so that the conductive polyester composition has a surface impedance of not greater than $10^7$ Ω/sq;
   a compatibilizer configured to assist in dispersing the plurality of carbon nanotubes in the polyester base material, wherein, based on a total weight of the conductive polyester composition, a content of the compatibilizer is between 1.5 wt% and 10 wt%,
   wherein the plurality of carbon nanotubes of the conductive reinforcing material are at least one material selected from a group consisting of hydroxylated carbon nanotubes and carboxylic carbon nanotubes; wherein the compatibilizer is a polyolefin compatibilizer formed by grafting, modification or copolymerization of glycidyl methacrylate (GMA), or a siloxane compound.

2. The conductive polyester composition according to claim 1, wherein in each of the carbon nanotubes, the length is between 10 micrometers and 20 micrometers, and the diameter is between 5 nanometers and 20 nanometers.

3. The conductive polyester composition according to claim 1, wherein, based on a total weight of the conductive polyester composition, a content of the polyester base material is between 70 wt % and 95 wt %, and a content of the conductive reinforcing material is between 1.5 wt % and 10 wt %.

4. The conductive polyester composition according to claim 1, wherein the plurality of carbon nanotubes of the conductive reinforcing material are multi-walled carbon nanotubes (MWCNT) having a multi-layer carbon atom structure.

5. The conductive polyester composition according to claim 1, wherein the glycidyl methacrylate in a molecular structure of the compatibilizer is capable of carrying out a ring cleavage reaction in a mixing process, and an epoxy group in the glycidyl methacrylate is capable of carrying out a chemical reaction with a reactive functional group on a surface of the carbon nanotube and/or an ester group in a molecular structure of the polyester base material after the ring cleavage reaction, so that the carbon nanotubes are dispersed in the polyester base material; wherein the reactive functional group on the surface of the carbon nanotube is at least one of a —OH functional group and a —COOH functional group.

6. The conductive polyester composition according to claim 1, wherein the plurality of carbon nanotubes of the conductive reinforcing material are at least one material selected from a group consisting of hydroxylated multi-walled carbon nanotubes and carboxylic multi-walled carbon nanotubes.

7. The conductive polyester composition according to claim 1, wherein the compatibilizer is at least one material selected from a group consisting of an ethylene-methyl acrylate-glycidyl methacrylate copolymer (E-MA-GMA), polyolefin elastomer-grafted glycidyl methacrylate (POE-g-GMA), polyethylene-grafted glycidyl methacrylate (PE-g-GMA), and a siloxane compound.

8. The conductive polyester composition according to claim 1, further comprising: an antioxidant, wherein, based on a total weight of the conductive polyester composition, a content of the antioxidant is between 0.1 wt % and 1 wt %.

9. The conductive polyester composition according to claim 1, wherein the conductive polyester composition is capable of mixing modification of a twin-screw process, and the conductive polyester composition has a surface impedance of not greater than $10^7$ Ω/sq after the mixing modification of the twin-screw process.

10. The conductive polyester composition according to claim 9, wherein, after the conductive polyester composition is subjected to the mixing modification of the twin-screw process, a conductive polyester sheet material is formed; wherein the conductive polyester sheet material has a surface impedance of $10^3$ Ω/sq to $10^4$ Ω/sq before an extension, and has a surface impedance of $10^4$ Ω/sq to $10^7$ Ω/sq after a 200% to 400% extension along an extension direction.

\* \* \* \* \*